US008427281B2

(12) United States Patent
Tsujimoto et al.

(10) Patent No.: US 8,427,281 B2
(45) Date of Patent: Apr. 23, 2013

(54) APPARATUS FOR READING RFID TAG INFORMATION AND RFID TAG INFORMATION READING SYSTEM

(75) Inventors: Yoshiyuki Tsujimoto, Aichi-ken (JP); Takuya Nagai, Aichi-ken (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 518 days.

(21) Appl. No.: 12/635,865

(22) Filed: Dec. 11, 2009

(65) Prior Publication Data

US 2010/0090807 A1    Apr. 15, 2010

Related U.S. Application Data

(63) Continuation-in-part of application No. PCT/JP2008/061240, filed on Jun. 19, 2008.

(30) Foreign Application Priority Data

Jul. 18, 2007   (JP) ................................. 2007-186971

(51) Int. Cl.
*H04Q 5/22*   (2006.01)
(52) U.S. Cl.
USPC ..... 340/10.2; 340/10.1; 340/10.3; 340/572.1; 235/385
(58) Field of Classification Search ........ 340/10.1–10.6, 340/572.1–572.9; 235/385
See application file for complete search history.

(56) References Cited

U.S. PATENT DOCUMENTS

| | | | | |
|---|---|---|---|---|
| 4,011,562 A | * | 3/1977 | Bruce | 342/46 |
| 6,046,683 A | * | 4/2000 | Pidwerbetsky et al. | 340/10.4 |
| 6,079,619 A | * | 6/2000 | Teraura et al. | 235/380 |
| 6,917,291 B2 | * | 7/2005 | Allen | 340/572.1 |
| 7,079,009 B2 | * | 7/2006 | Gallagher et al. | 340/10.2 |
| 2010/0176926 A1 | * | 7/2010 | Jo et al. | 340/10.2 |

FOREIGN PATENT DOCUMENTS

| | | |
|---|---|---|
| JP | 07-271885 | 10/1995 |
| JP | 08-223081 | 8/1996 |
| JP | 2001-231716 A | 8/2001 |
| JP | 2002-216092 | 8/2002 |
| JP | 2005-252983 | 9/2005 |
| JP | 2006-211312 | 8/2006 |
| JP | 2007-159806 | 6/2007 |
| WO | 2007/074671 A1 | 7/2007 |

OTHER PUBLICATIONS

Japanese Office Action in JP 2007-186971 of Mar. 27, 2012.

* cited by examiner

*Primary Examiner* — Jennifer Mehmood
*Assistant Examiner* — Ryan Sherwin
(74) *Attorney, Agent, or Firm* — McCarter & English, LLP

(57) ABSTRACT

This disclosure discloses an apparatus for reading radio frequency identification (RFID) tag information configured to perform information transmission and reception with a plurality of RFID tag circuit elements having an IC circuit part storing information and a tag antenna connected to the IC circuit part, comprising: a first movement detecting portion configured to detect a moving state of the apparatus for reading RFID tag information; a transmitting portion configured to generate a reading command to acquire the information stored in the IC circuit part and to transmit the command to the RFID tag circuit element; and a first reading control portion configured to control the number of reading trial times per unit time using the reading command by the transmitting portion according to a detection result of the first movement detecting portion.

11 Claims, 12 Drawing Sheets

FIG. 5

| MOVING SPEED v | SLOT-NUMBER SPECIFIED VALUE Q |
|---|---|
| $0 \leqq v < v1$ | Q1=8 |
| $v1 \leqq v < v2$ | Q2=7 |
| $v2 \leqq v < v3$ | Q3=6 |
| $v3 \leqq v$ | Q4=5 |

APPARATUS FOR READING RFID TAG INFORMATION AND RFID TAG INFORMATION READING SYSTEM

CROSS-REFERENCE TO RELATED APPLICATION

This is a CIP application PCT/JP2008/61240, filed Jun. 19, 2008, which was not published under PCT article 21(2) in English.

BACKGROUND OF THE INVENTION

1. Field of the Invention

The present invention relates to an apparatus for reading a radio frequency identification (RFID) tag information configured to read information from an RFID tag capable of radio communication of information with the outside and an RFID tag information reading system.

2. Description of the Related Art

A Radio Frequency Identification system configured to read or write information with respect to a small-sized RFID tag is known. In this RFID system, a reader/writer transmits an inquiry and receives a response in a non-contact manner with respect to the RFID tag.

In a label-shaped RFID tag, for example, an RFID tag circuit element is disposed. The RFID tag circuit element is provided with an IC circuit part storing predetermined RFID tag information and an antenna connected to the IC circuit part for information transmission and reception. If a transmission antenna of the reader/writer transmits a transmission wave to the RFID tag, the RFID tag circuit element replies in response to the transmission wave. In a prior art reference, for example, a method of smoothly conducting communication with the RFID tag circuit element in such an apparatus for reading RFID tag information configured to conduct communication is described.

In the prior art reference, a tag reader as an apparatus for reading RFID tag information configured to read information sent from an RFID IC tag, which is an RFID tag circuit element, that is, to read tag data is disposed. To this apparatus for reading RFID tag information, a speed detecting device as movement detecting portion configured to detect a moving speed of the apparatus for reading RFID tag information, that is, a moving speed of an automobile on which the apparatus is mounted is connected. According to the moving speed detected by the movement detecting portion, a direction variable device sets a direction of directivity of the apparatus for reading RFID tag information. As a result, accuracy of information reading from the RFID tag circuit element while the apparatus for reading RFID tag information is moving is improved.

In the meantime, a method in which when a response is prompted from a plurality of RFID tag circuit elements present in a communication range, time sections for reception divided into plural, that is, identification slots are prepared in advance has been already known. In this method, a response signal from each of the plurality of RFID tag circuit elements is temporally separated to the identification slots corresponding to tag identification information, for example, and detected.

By using such identification slots, occurrence of collision of the response signals from the RFID tag circuit elements is prevented, and accuracy of information transmission and reception can be effectively improved. However, since signals need to be received for the plurality of identification slots for a single reading command, time required for transmission and reception processing for a single command is inevitably prolonged. In the case of communication with the plurality of RFID tag circuit elements while moving as with the apparatus for reading RFID tag information of the prior art reference, communication areas are constantly changing. As a result, the reading command does not reach a part of the RFID tag circuit elements and causes no response. That is, there is a fear that non-started tag might remain. Also, though the command reaches and the RFID tag circuit element makes a response, the reading apparatus goes far away and cannot receive the response, that is, there is a fear that the reader does not receive a response. As described above, in the prior art reference, there is a possibility of two non-reading cases, namely, remaining of the non-started tag and non-reception of a response by the reader.

In the prior art reference, no particular consideration has been given to occurrence of non-reading caused by the identification slots as above and a measure against it in communication by the apparatus for reading RFID tag information while moving.

SUMMARY OF THE INVENTION

An object of the present invention is to provide an apparatus for reading RFID tag information that can prevent non-reading and reliably acquire information even in communication while moving, and an RFID tag information reading system using the apparatus for reading RFID tag information.

BRIEF DESCRIPTION OF THE DRAWING

FIG. 5 is a slot-number specified value table managing correspondence between moving speeds of the reader and slot number specified values;

DETAILED DESCRIPTION OF THE PREFERRED EMBODIMENTS

An embodiment of the present invention will be described below referring to the attached drawings.

Figure 1:
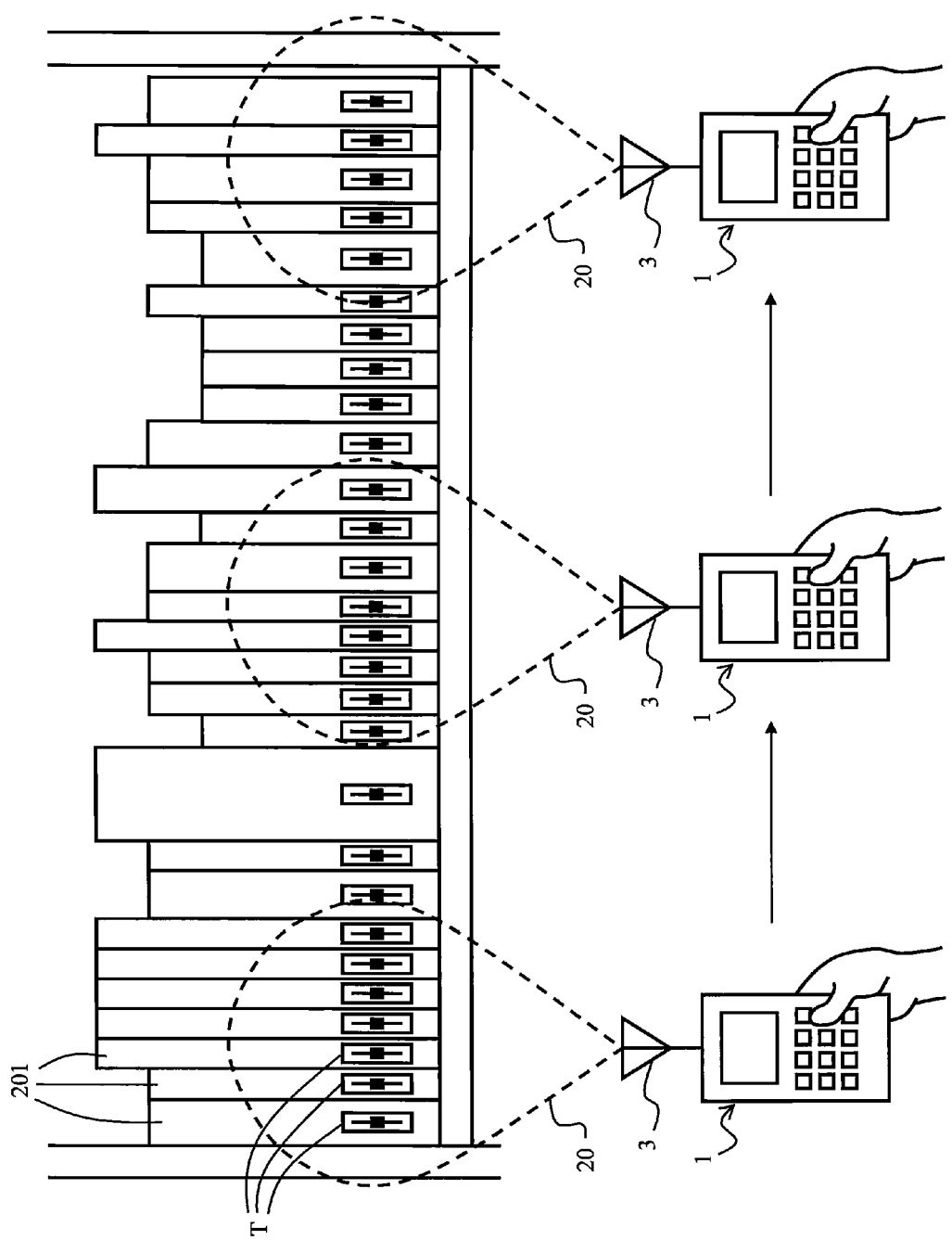
FIG. 1 is a diagram illustrating an example of a case in which an apparatus for reading RFID tag information of an embodiment of the present invention is applied to management of books stored in a bookcase.

In FIG. 1, on a single shelf board in a bookcase in this example, a plurality of books 201 are aligned vertically in a horizontal direction, that is, in a right and left direction in the figure for storage. On each of spine labels on the books 201, an RFID tag T is attached in the same direction, that is, in an illustrated example, with a longitudinal direction of the RFID tag T directed vertically.

A reader 1, which is an apparatus for reading RFID tag information of this embodiment is a portable type, that is, a handheld type. An administrator of the books 201, who is an operator, takes the reader 1 in hand and moves it along a direction in which the plurality of books 201 are aligned, that is, in the right and left direction in the figure in an arrow direction in the figure. At this time, the operator may walk to move by himself or the operator may only swing his arm so as to move the reader 1 without moving by himself. Then, the reader 1 reads information relating to the corresponding book 201 from the RFID tag T attached to each of the books 201 via radio communication reading a reader antenna 3. As a result, the operator manages a storage state of each of the books 201.

Figure 2:
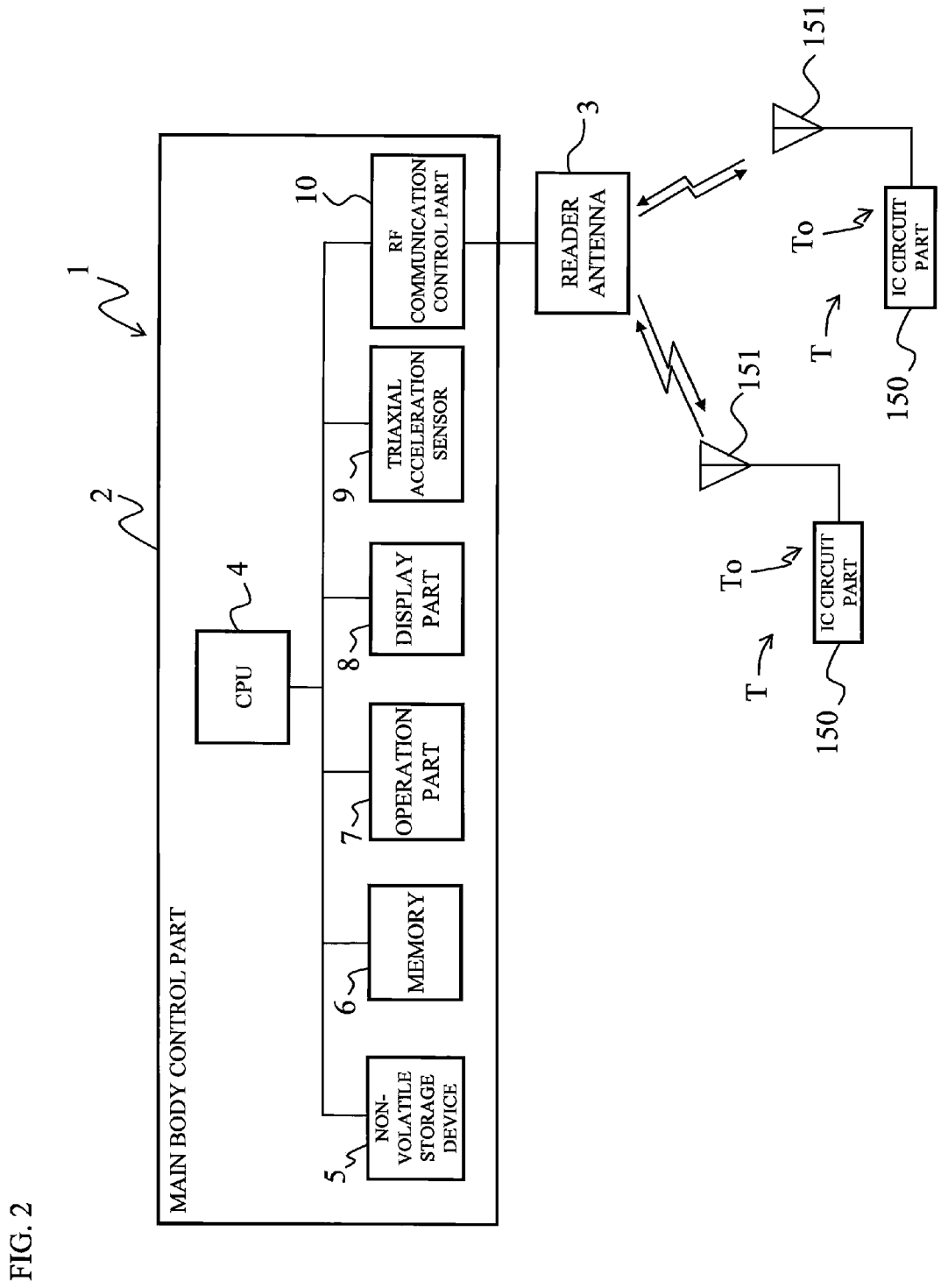
FIG. 2 is a system configuration diagram illustrating an outline of a reader.

As shown in FIG. 2, the reader 1 has a main body control part 2 and the reader antenna 3. The main body control part 2 has a CPU 4, a non-volatile storage device 5 as a correlation storage device, a memory 6, an operation part 7, a display part 8, an acceleration sensor 9, and an RF communication control part 10. The non-volatile storage device 5 includes a hard disk device or flash memory. The non-volatile storage device 5 stores parameters relating to information reading processing of the reader 1 (the details will be described later) and various type of information such as management state of the books 201. The memory 6 includes a RAM and a ROM, for example. The operation part 7 has instructions and information from the operator inputted. The display part 8 displays various types of information and messages. The acceleration sensor 9 includes a known triaxial acceleration sensor, for example, and detects a moving acceleration when the reader 1 moves. The RF communication control part 10 controls radio communication with the RFID tag T through the reader antenna 3.

The CPU 4 executes signal processing according to a program stored in the ROM in advance while using a temporary storage function of the RAM. The CPU 4 executes various controls of the entire reader 1. Also, the CPU 4 processes a signal read of an IC circuit part 150 of an RFID tag circuit element To and reads information and also creates a response request command (the details will be described later) to access the IC circuit part 150 of the RFID tag circuit element To.

The acceleration sensor 9 is a known MEMS sensor, for example. The acceleration sensor 9 individually detects a moving acceleration in direction corresponding to each of a width direction, a length direction, and a thickness direction of a housing of the main body control part 2 in the reader 1, in other words, directions of coordinate axes in the housing. At this time, by integrating accelerations in each axial direction detected by the acceleration sensor 9 by a known integration method, for example, the CPU 4 can calculate components of the moving speed corresponding to each direction of the reader 1, in other words, components of a moving amount per time, respectively.

The RFD tag T has an RFID tag circuit element To provided with a tag antenna 151 and the IC circuit part 150. The RFID tag T is configured by providing the RFID tag circuit element To on a base material, not particularly shown, and can be attached to an article such as the book 201.

The RF communication control part 10 accesses information of the IC circuit part 150 of the RFID tag circuit element To, that is, the RFID tag information including a tag ID through the reader antenna 3.

Using the RF communication control part 10 with the configuration, the reader 1 transmits a response request command as a reading command to the RFID tag circuit elements To of the plurality of RFID tags T present in its communicable area. This response request command is a command to request transmission of the tag ID, which is identification information of each of the RFID tag circuit element To as a response signal.

This response request command is a search command for making a search in a condition that the number of RFID tag circuit elements To expected to respond is uncertain, for example. This response request command includes a slot number specified value Q for specification with any of values from 0 to 15 in this example. If the response request command is transmitted from the RF communication control part 10 through the reader antenna 3, each of the RFID tag circuit elements To creates and maintains slot count values S from 0 to $2^Q-1$, that is, up to Q power of 2-1 by random numbers.

Then, after the RF communication control part 10 transmits the response request command through the reader antenna 3 by means of control of the CPU 4, the RF communication control part 10 and the CPU 4 wait for a response from the RFID tag circuit element To in a predetermined identification slot. The RFID circuit element To that created a value 0 as the slot count value S responds in the identification slot immediately after the transmission of the response request command.

After that, by means of the control of the CPU 4, the RF communication control part 10 further transmits a slot-count subtraction command, and the RF communication control part 10 and the CPU 4 wait for the response of the RFID tag circuit element To in a predetermined identification slot time frame disposed immediately after the transmission. Each of the RFID tag circuit elements To having received the slot-count subtraction command subtracts its own slot count value S and maintains it and transmits a response signal in the identification slot when the slot count value S becomes a value 0. This response signal is a response signal including the tag ID or a signal using a 16-bit pseudo random number, for example, in order to acquire permission of ID transmission.

As described above, each of the RFID tag circuit elements To replies a response signal in different identification slots. As a result, the RF communication control part 10 and the CPU 4 can clearly receive and takes in the tag ID of each of the RFID tag circuit elements To through the reader antenna 3 without being subjected to interference. In the specification of this application, as described above, processing in which after the response request command is transmitted from the reader 1 once, transmission and reception of information with the RFID tag T in the identification slots of the predetermined number or $2^Q-1$ times in this example is repeated is referred to as reading trial processing. Also, the number of reading trial processing times by the reader 1 is referred to as the number of reading trial times (the details will be described later).

Figure 3:
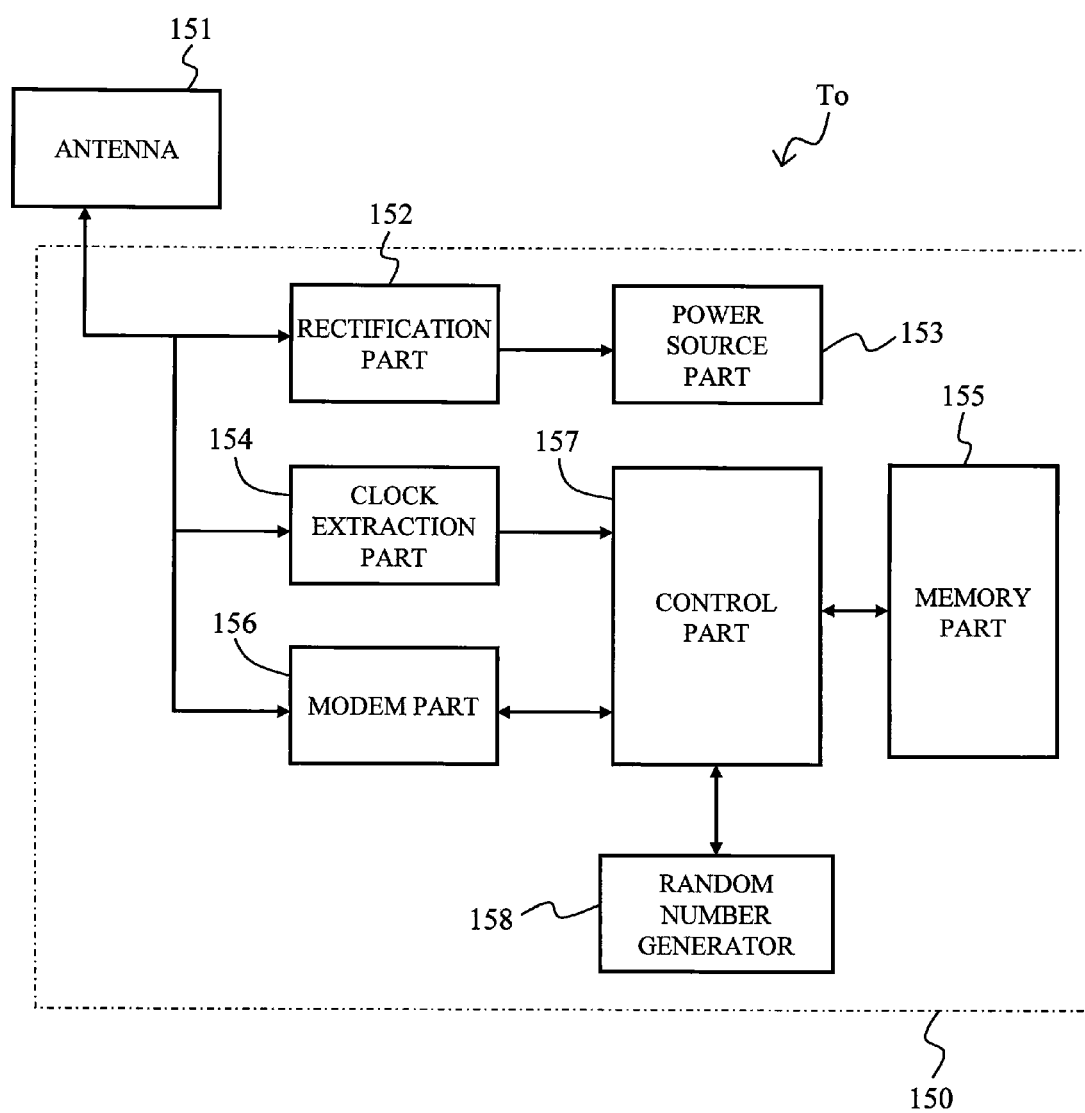
FIG. 3 is a block diagram illustrating an example of a functional configuration of an RFID tag circuit element provided in an RFID tag.

In FIG. 3, the RFID tag circuit element To has the tag antenna 151 performing transmission and reception of a signal in a non-contact manner with the reader antenna 3 of the reader 1 as described above and the IC circuit part 150 connected to the tag antenna 151.

The IC circuit part 150 is provided with a rectification part 152, a power source part 153, a clock extraction part 154, a memory part 155, a modem part 156, a random number generator 158 (the details will be described later), and a control part 157. The rectification part 152 rectifies an interrogation wave received by the tag antenna 151. The power source part 153 accumulates energy of the interrogation wave rectified by the rectification part 152 and uses the energy as a driving power source of the RFID tag circuit element To. The clock extraction part 154 extracts a clock signal from the interrogation wave received by the tag antenna 151 and supplies the signal to the control part 157. The memory part 155 stores a predetermined information signal. The random number generator 158 generates a random number when a response request command is received from the reader 1. To which identification slot a response signal should be outputted is determined by the random number. The control part 157 controls operations of the RFID tag circuit element To through the memory part 155, the clock extraction part 154, the random number generator 158, and the modem part 156, for example.

The modem part 156 demodulates an interrogation wave from the reader antenna 3 of the reader 1, received by the tag antenna 151. The modem part 156 also modulates a reply signal from the control part 157 and transmits it as a response wave, that is, a signal including the tag ID, from the tag antenna 151.

The random number generator 158 generates a random number from 0 to $2^Q-1$ to a slot number specified value Q specified in the response request command from the reader 1.

The control part 157 interprets a received signal demodulated by the modem part 156 and generates a reply signal on the basis of the information signal stored in the memory part 155. Then, the modem part 156 transmits the reply signal through the tag antenna 151 in an identification slot corresponding to the random number generated by the random number generator 158.

Here, the most distinguishable characteristic of the reader 1 of this embodiment is that the number of reading trial times per unit time is controlled according to the moving speed of the reader 1 as a moving amount detected and calculated by the acceleration sensor 9. By means of this control, even if reader 1 repeats the reading trial processing during movement, all the RFID tags T to be read can receive the response request command. The details will be sequentially described below.

First, an arrangement relationship of the RFID tags T capable of information transmission and reception if the reader 1 moves will be described.

Figure 4:
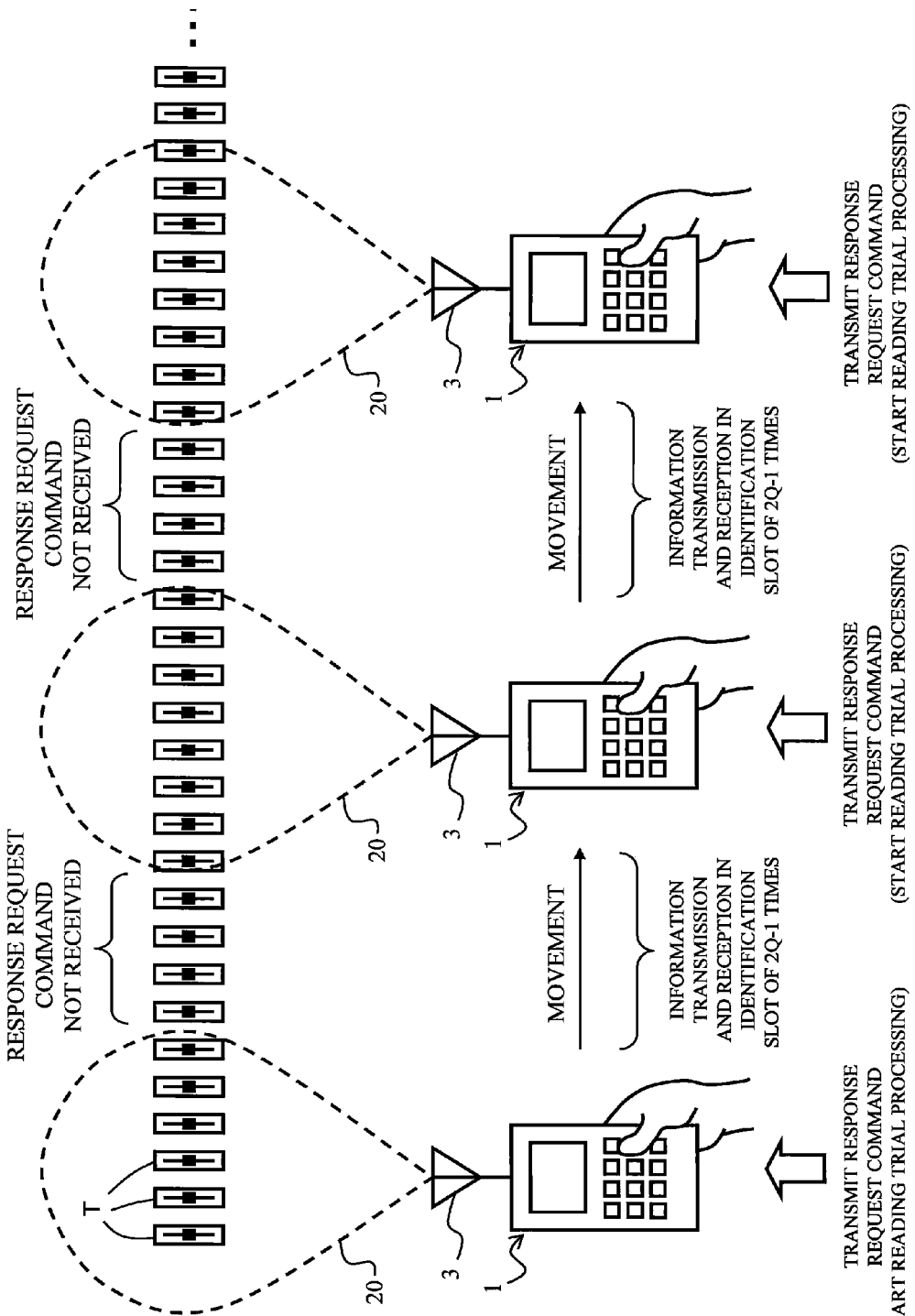
FIG. 4 is a diagram illustrating an example of an arrangement relationship of the RFID tags to become capable of communication if the reader and a communicable area thereof are moved.

In FIG. 4, in this example, similarly to the case in FIG. 1, a large number of the RFID tags T are arranged in a single row in a sufficiently long distance with a high density. The reader 1 moves in parallel with an alignment direction of the RFID tag row from one end to the other end while orienting a communicable area 20 extended from the reader antenna 3 toward the RFID tag row. The reader 1 reads tag information of each of the RFID tags T by repeating the reading trial processing while moving.

The communicable area 20 of the reader 1, which is a range shown by a broken line in the figure, is a range limited by output power of the reader antenna 3, that is, aerial power. Thus, the response request command transmitted only once at the first when the reader 1 performs the reading trial processing is received by an RFID tag group in a certain range.

After the transmission of the response request command, the reader 1 repeats the identification slot $2^Q-1$ times while continuing moving and waits for a response signal from the RFID tag T having received the response request command. For example, there is a case in which the slot number specified value Q included in the response request command is large, that is, the number of identification slots M is large and a waiting period during that is long and the moving speed of the reader 1 is fast. In such a case, an interval between the RFID tag group having read the response request command in the previous reading trial processing and the RFID tag group to read the response request command of the subsequent reading trial processing gets longer. That is, the RFID tag T present between the two groups cannot receive the response request command.

Thus, if the reader 1 moves over the entire RFID tag row, it cannot perform information transmission and reception with the RFID tags T that could not receive the response request command, that is, non-reading of information occurs. In the illustrated example, the reader antenna 1 has directivity only in one direction, but the non-reading of information can occur in the case of the limited communicable area even if the reader antenna 3 is non-directional.

As a measure to prevent non-reading of information due to movement of the reader 1, on the premise that the moving speed of the reader 1 is constant, that is, the speed at which the operator moves the reader 1 is constant, increase in the number of reading trial times per unit time so as to transmit the response request command with a high frequency is effective. For that purpose, it is only necessary that the slot number specified value Q is set low when the reader 1 is moving.

On the other hand, if the slot number specified value Q is too low, the number of identification slots performed after the response request command, that is, the number of identification slot performing times (hereinafter referred to as identification slot number M) runs short. That is, a chance to read information from the RFID tags T runs short. As a result, a possibility that the response signals from the plurality of RFID tags T collide against each other is increased. Also, if the moving speed of the reader 1 is relatively fast in comparison with the size of the communicable area 20, it is necessary to increase the number of reading trial times per unit time, that is, to decrease the slot number specified value Q. On the contrary, if the moving speed of the reader 1 is relatively slow in comparison with the size of the communicable area 20, the number of reading trial times per unit time may be small. From the above, the slot number specified value Q needs to be set to an appropriate value which is neither deficient nor excessive according to the size of the communicable area 20 and the moving speed of the reader 1.

Subsequently, a slot-number specified value table stored and maintained in the non-volatile storage device 5 of the reader 1 will be described.

In FIG. 5, in the slot-number specified value table, a moving speed v of the reader 1 and a slot number specified value Q to become an appropriate identification slot number M with respect to the moving speed v are stored in a form of correlated information associated with each other. This correlation is measured as typical values in advance or acquired by a predetermined calculation. The measurement or calculation is executed on the premise that the size of the communicable area 20 of the reader 1 is fixed, for example, and the number of RFID tags T that can be accommodated in it, that is, the number of the RFID tags T that can transmit the response request command at once is substantially a given value.

As for the moving speed v of the reader 1, threshold values 0, v1, v2, and v3 are set in an order from the smallest. A section between the adjacent threshold values and a section of v3 and more without upper limit are set in the slot-number specified value table. In this example, the moving speed v is an absolute value, and moving in both directions of one direction and the opposite direction is not discriminated. The moving speed in each direction may be discriminated by positive or negative.

For the slot number specified value Q, values Q1, Q2, Q3, and Q4 which become the appropriate identification slot numbers M, respectively, or become the identification slot numbers M temporarily set at smaller than that are set in accordance with each section of the moving speed v. In the illustrated example, Q1=8, Q2=7, Q3=6, and Q4=5. These set values Q1, Q2, Q3, and Q4 are, as described above, set in advance considering the size of the communicable area 20 before executing the first reading trial processing. The values Q1, Q2, Q3, and Q4 are modified and updated as appropriate every time actual reading trial processing is executed (the details will be described later).

Figure 6:
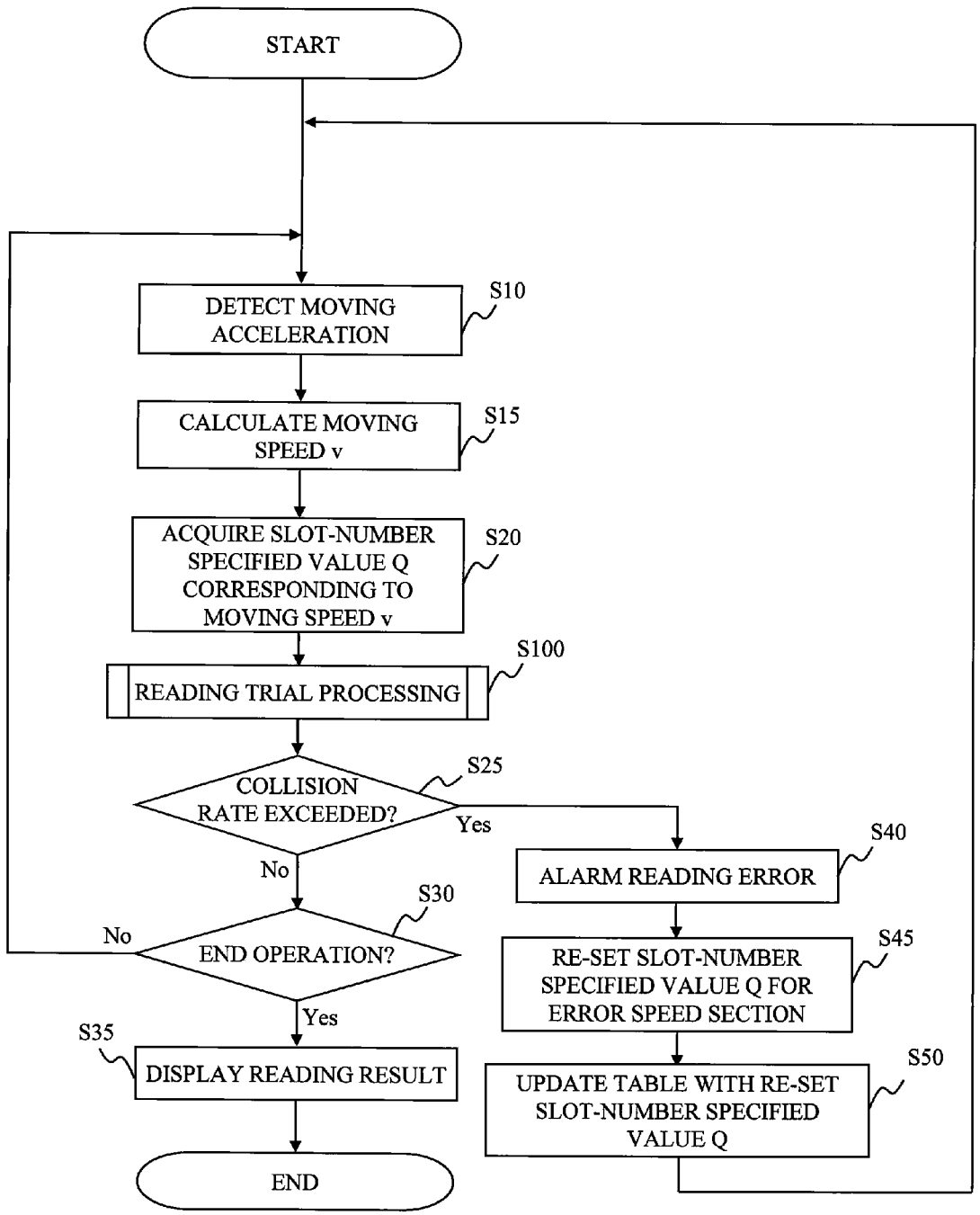
FIG. 6 is a flowchart illustrating a control procedure executed by a CPU of the reader.

In FIG. 6, in this example, if an operation to start the reading processing of the RFID tag T after the power is on or by the operation part 7, for example, this flow is started.

First, at Step S10, the CPU 4 inputs a moving acceleration detected by the acceleration sensor 9. After that, the routine goes on to Step S15, and the CPU 4 calculates the moving speed v of the reader 1 on the basis of the moving acceleration detected at Step S10. This moving speed v can be calculated by cumulatively integrating the moving accelerations detected at Step S10, for example, by a known integration method. Procedures at Step S10 and Step S15 constitute a moving amount detecting portion configured to detect a moving amount of the reader 1 and also constitute a first movement detecting portion configured to detect a moving state.

Instead of detection of the moving amount at Step S10 and Step S15, that is, the moving speed, a direction with the largest acceleration in the accelerations in the directions detected by the acceleration sensor 9 is detected as a major moving direction, and this may be used instead of the moving amount. This detection functions as a moving direction detecting portion and a moving amount detecting portion. In this case, in the slot-number specified value table shown in FIG. 5, the moving direction of the reader 1 and the slot number specified value Q to become the appropriate identification slot number M for that are stored in a form of correlated information associated with each other.

Also, before Step S10, a step in which a moving direction of the reader 1 is set by the operator operating the reader 1 through the operation part 7, for example, may be provided. In this case, at Step S10, only the moving acceleration in a predetermined moving direction set at the step or in the horizontal direction, for example, is detected or its component is extracted. In this case, even if the reader 1 moved with inclination to the set moving direction from upper left to lower right diagonally, for example, only the speed component in the set moving direction, that is, an alignment direction of the RFID tag row can be calculated at Step S15. As described above, by extracting the moving speed v or the moving direction matching a predetermined direction in which the plurality of RFID tag circuit elements To as communication targets are aligned, wasteless reading control with high accuracy can be executed. The procedure at Step S15 in this case functions as a moving component extracting portion configured to extract a component in a predetermined direction in the moving speed v or the moving direction detected at Step S10.

After that, the routine goes on to Step S20, and the CPU 4 acquires the slot number specified values Q1 to Q4 corresponding to the moving speed v calculated at Step S15 from the slot-number specified value table of the non-volatile storage device 5 as shown in FIG. 5 as an example. This step functions as a slot control portion and also functions as a first reading control portion.

After that, at Step S100, the CPU 4 executes the reading trial processing (for details, see FIG. 7, which will be described later). That is, the CPU 4 transmits the response request command including the slot number specified value Q acquired at Step S20 to the RFID tag groups present in the communicable area 20 at that point of time. After that, the CPU 4 individually transmits and receives information with respect to each of the RFID tags T in the identification slot of $2^Q-1$ times so as to acquire RFID tag information including the tag ID.

In this reading trial processing, to the RFID tag circuit element To which can be normally read without collision of a response signal, the CPU 4 transmits a predetermined sleep signal to bring the element To a sleep state. As a result, in the reading trial processing to be subsequently performed again, the CPU 4 can perform the reading processing only for the RFID tag circuit element to whose RFID tag information has not been read normally. As a result, the number of RFID tag circuit elements To to be read can be reduced, collision of response signals is avoided with the sufficient identification slot number M, and the CPU 4 can execute more reliable reading processing.

After that, the routine goes on to Step S25, and in the reading trial processing at Step S100, a proportion of the identification slots in which collision of the response signals occurs in the identification slots prepared in reception, that is, if a collision rate exceeds a predetermined value or 50%, for example, or not is determined. This step functions as a collision determining portion. If the collision rate is at a predetermined value or less, the determination at Step S25 is not satisfied, that is, it is determined that excessive collision of the response signals due to shortage of the identification slot number M is not found, and the routine goes on to the subsequent Step S30.

At Step S30, the CPU 4 determines if an operation to end the reading trial processing has been made by the operator through an input operation on the operation part 7 or not. If the end operation has not been made, the determination is not satisfied. In this case, it is considered that reading of all the RFID tags T have not been finished yet, and the routine returns to Step S10, where the similar procedure is repeated. On the other hand, if the end operation has been performed, the determination at Step S30 is satisfied. In this case, it is considered that reading of all the RFID tags T has finished, and the routine goes on to Step S35. At Step S35, the CPU 4 outputs a display signal to the display part 8 so that the RFID tag information such as the tag IDs which have been read so far is displayed on the display part 8, and this flow is finished. Display of the RFID tag information which has been read on the display part 8 is not limited to the time when the end operation is performed. That is, the display part 8 may sequentially display reading results while the reading is continued, namely, while the routine returns from Step S30 to Step S10 so as to repeat the similar procedure.

On the other hand, if the collision rate is larger than the predetermined value in the determination at Step S25, the determination at Step S30 is satisfied. In this case, it is considered that the identification slot number M runs short and collision of the response signals, that is, interference occurs abnormally largely, and the routine goes on to Step S40.

At Step S40, the CPU 4 outputs a control signal to the display part 8 so as to display the fact that the reading trial processing failed on the display part 8 and to alarm a reading error to the operator. This step functions as an alarming portion. As a result, the operator can recognize that the current control of the reading trial times has not exerted sufficient effects to the actual communication environment and is not appropriate, in other words, a measure such as further readjustment of the reading trial times is needed.

After that, the routine goes on to Step S45, and the CPU 4 executes re-setting processing on the basis of the input operation by the operator on the operation part 7 to the slot number specified value Q corresponding to the reader moving speed v when the reading trial processing has failed.

That is, first, the CPU 4 outputs a display signal to the display part 8, for example, to have the moving speed v of the reader 1 and the slot number specified value Q which has been set corresponding to that when the reading error occurs immediately before displayed on the display part 8 so that the operator can recognize it. In order to avoid the reading error, if the operator has modified the corresponding slot number specified value Q by increasing it by 1 so as to re-set it, for example, since the identification slot number M is set at $M=2^Q-1$ as described above, increase of the slot number specified value Q by 1 increases the identification slot number M approximately twice. As a result, reception of the response signal can be performed with allowance. The re-setting of the slot number specified value Q is not limited to the arbitrary one by the operator. That is, setting may be made on the increase side or the decrease side or along a predetermined pattern such as setting of a change width, or it may be so configured that the CPU automatically re-sets the slot number specified value Q at random. Also, if an external cause such as use of a mobile phone at occurrence of the reading error is known and it is confirmed that the cause will not occur again, this re-setting processing can be omitted.

Then, the routine goes on to Step S50, and the CPU 4 updates the value of the corresponding slot number specified value Q in the slot-number specified value table using the slot number specified value Q re-set at Step S45. However, if the re-setting is omitted, this updating procedure can be also omitted. This Step S50 functions as a correlation updating portion. By overwriting the slot-number specified value table by the value corresponding to the state after readjustment and updating it as above, setting of the slot number specified value Q in the slot-number specified value table can be improved to an appropriate value to information acquisition in the actual communication environment. Also, by overwriting and updating the actual state as above, even if the number or type of the RFID tag circuit elements To or peripheral radio environment including an interfering wave or the like is changed, the slot-number specified value table can be optimized, that is, made to be learned so as to follow the change.

When Step S50 is finished, the routine returns to Step S10, and the similar procedure is repeated.

Figure 7:
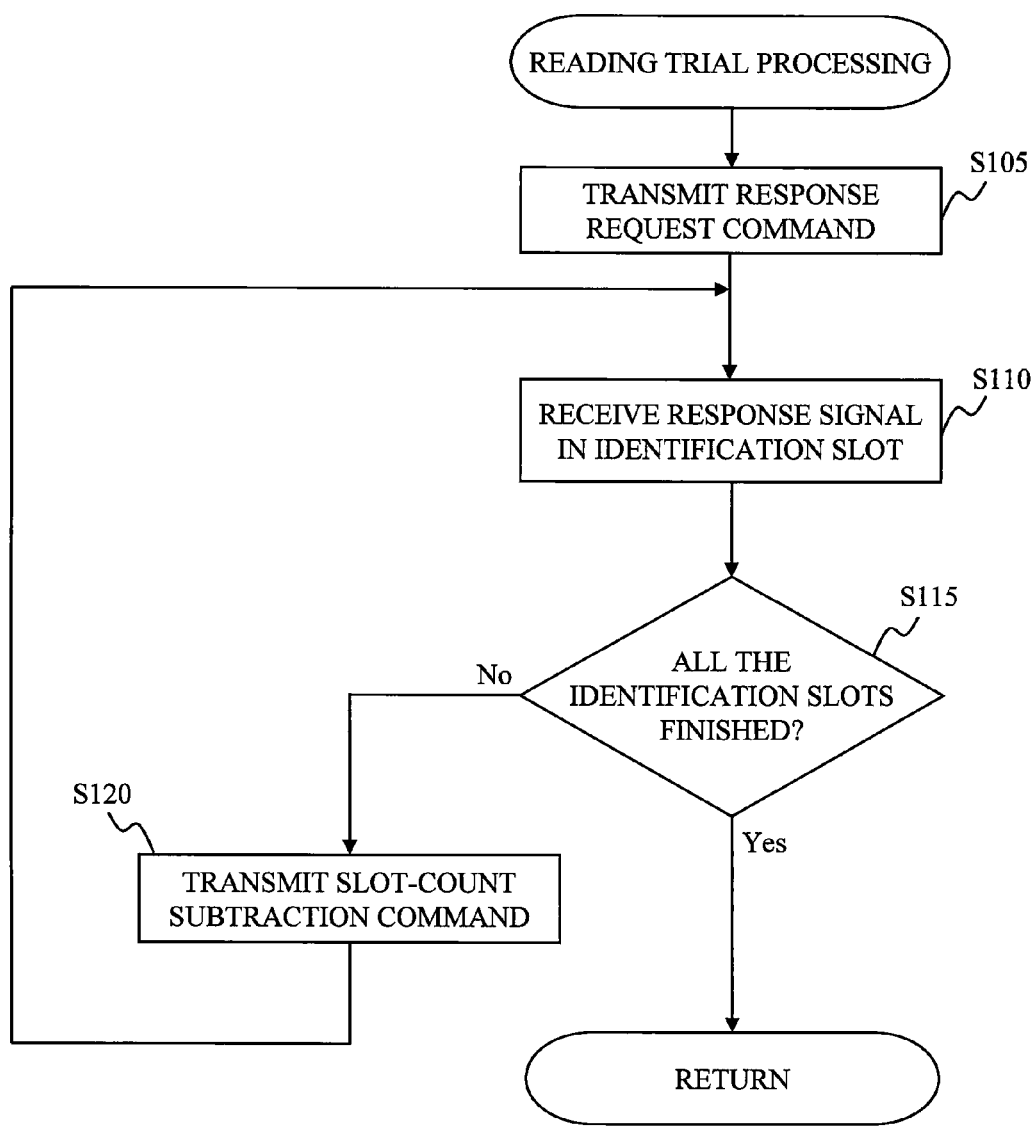
FIG. 7 is a flowchart illustrating a detailed procedure of reading trial processing executed at Step S100 in FIG. 6.

In FIG. 7, first, at Step S105, the CPU 4 creates a response request command by the RF communication control part 10. This response request command is a command to order transmission of RFID tag information including the respective tag ID as a response signal to each of the RFID tag circuit elements To present in the communicable area 20. The created response request command signal includes the slot number specified value Q acquired at Step S20 in the flow of FIG. 6. The response request command signal is transmitted from the RF communication control part 10 to the RFID tag circuit element To through the reader antenna 3.

After that, the routine goes on to Step S110, and the CPU 4 receives and takes in a response signal from the RFID tag circuit element To for a time frame of a predetermined identification slot such as time for a single slot through the reader antenna 3 and a reception part 213 of the RF communication control part 10. Even if there is no RFID tag circuit element To whose slot count value S becomes a value 0 and the response signal is not received, the CPU 4 maintains the reception state for the time of a single slot. At these Step S105 and Step S110, transmission and reception control for a single identification slot is performed.

After that, the routine goes on to Step S115, and the CPU 4 determines if the reception control has been executed for all the identification slots, in other words, if the reception in the identification slot of the Q power of 2-1 times corresponding to the slot number specified value Q notified by the response request command at Step S105 has been performed or not. If the reception control has not been executed for all the identification slots, the determination is not satisfied. In this case, it is considered that there are still the identification slots which have not been subjected to the reception control and the routine goes on to Step S120. On the other hand, if the reception control has been executed for all the identification slots, the determination is satisfied, and this flow is finished.

At Step S120, the CPU 4 transmits a slot count subtraction command to the RFID tag circuit element To through the RF communication control part 10 and the reader antenna 3. This slot count subtraction command is a command to order subtraction only by 1 of the value of the slot count value S (See FIG. 8, which will be described later) for clocking the timing of the identification slot in which each of the RFID tag circuit elements To transmits the response signal. If Step S120 is completed, the routine returns to Step S110, and the similar reception control for a single identification slot is repeated.

The procedure at Step S105 constitutes a transmitting portion configured to create a response request command to acquire information stored in the IC circuit part 150 and to transmit it to the RFID tag circuit element To. Also, Step S110 constitutes a receiving portion capable of sorting the response signal transmitted from the plurality of RFTD tag circuit elements To in response to the response request command created and transmitted by the reader antenna 3 and the RF communication control part 10 into a plurality of identification slots for reception.

Figure 8:
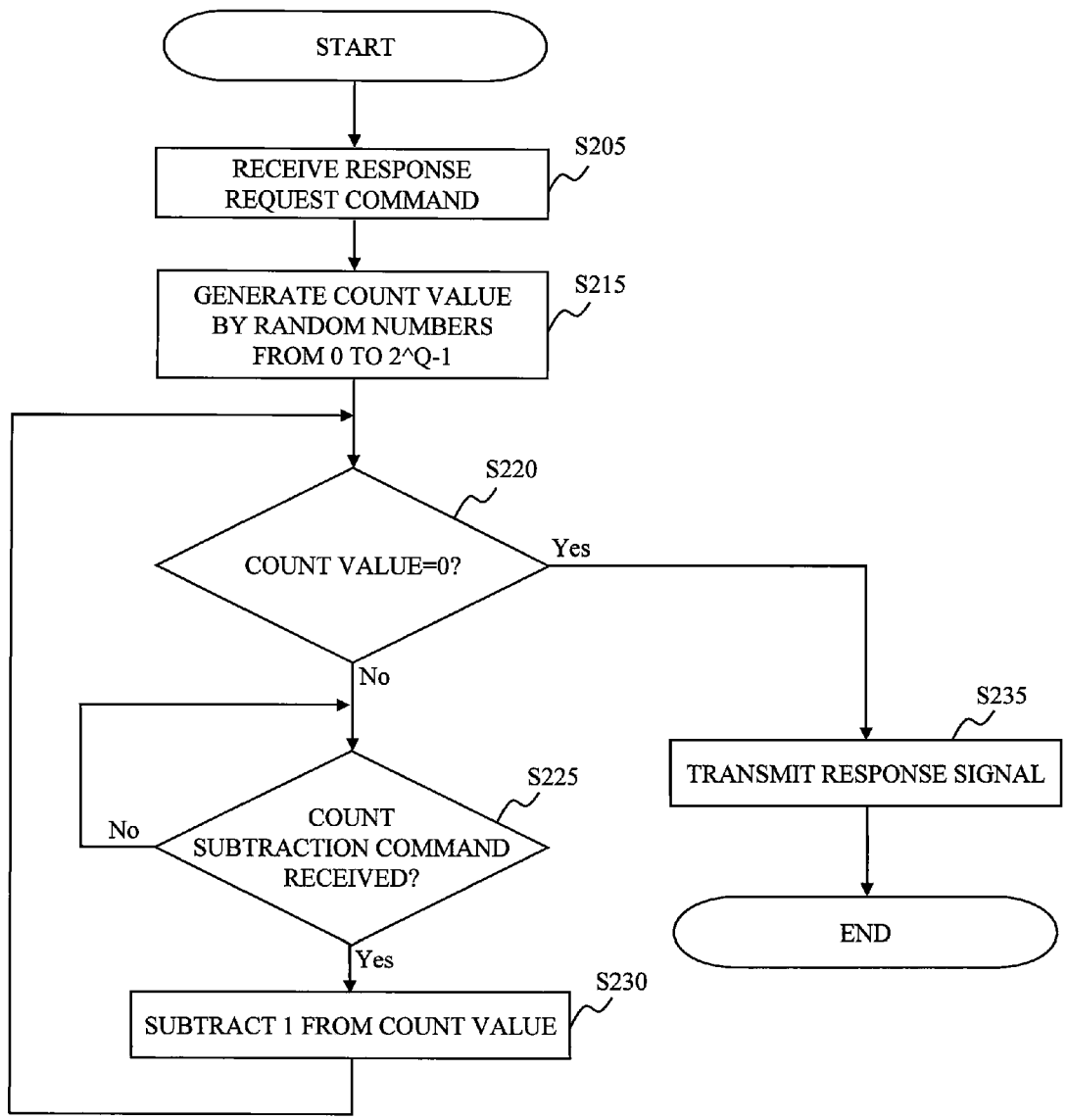
FIG. 8 is a flowchart illustrating a control procedure executed by a control part provided in the RFID tag circuit element.

In FIG. 8, if the RFID tag circuit element To receives an initialization command whose detailed description will be omitted and is given radio power by the initial signal and also the control part 157 is initialized, the RFID tag circuit element To is started, and this flow is started.

First, at Step S205, the control part 157 executes the reception control to interpret command contents of the response request command from the reader antenna 3 of the reader 1 received by the tag antenna 151 immediately after the RFID tag circuit element To is started. At this time, the slot number specified value Q included in the response request command is stored in the memory part 155.

After that, the routine goes on to Step S215, and on the basis of the slot number specified value Q stored in the memory part 155 at Step S205, the control part 157 has the random numbers from 0 to $2^Q-1$ generated by the random number generator 158 and makes the generated values count values. The count values become values from 0 to the identification slot number M, and the identification slot in which the RFID tag T transmits the response signal is specified.

After that, the routine goes on to Step S220, and the control part 157 determines if the count value is 0 or not. If the count value is not 0, the determination is not satisfied, that is, it is considered that the identification slot to transmit the response signal has not been reached yet, and the routine goes to the subsequent Step S225.

At Step S225, the control part 157 determines if the count subtraction command at Step S120 in the flow of FIG. 6 has been received through the tag antenna 151 or not. Till reception, the reception control is repeated for the identification slot at that time. If the count subtraction command is received, the determination is satisfied, the routine goes on to the subsequent Step S230, the count value is subtracted by 1 and the routine returns to Step S220, and the similar procedure is repeated.

On the other hand, if the count value is 0 at Step S220, the determination is satisfied. In this case, the RFID tag circuit element To is considered to have reached the identification slot to transmit the response signal, and the routine goes on to Step S235. At Step S235, the control part 157 generates a response signal including the tag ID of the RFID tag circuit element To stored in the memory part 155 by the modem part 156, replies it through the tag antenna 151 at predetermined timing, and this flow is finished. If the tag ID is long, in order to determine if collision can occur in the identification slot, the control part 157 may transmit a 16-bit pseudo random number generated and stored in advance as the response signal through the tag antenna 151, for example. In this case, the control part 157 transmits the tag ID after a tag ID transmission command transmitted from the reader 1 is received after normal reception of the response signal of the pseudo random number by the reader 1.

Figure 9:
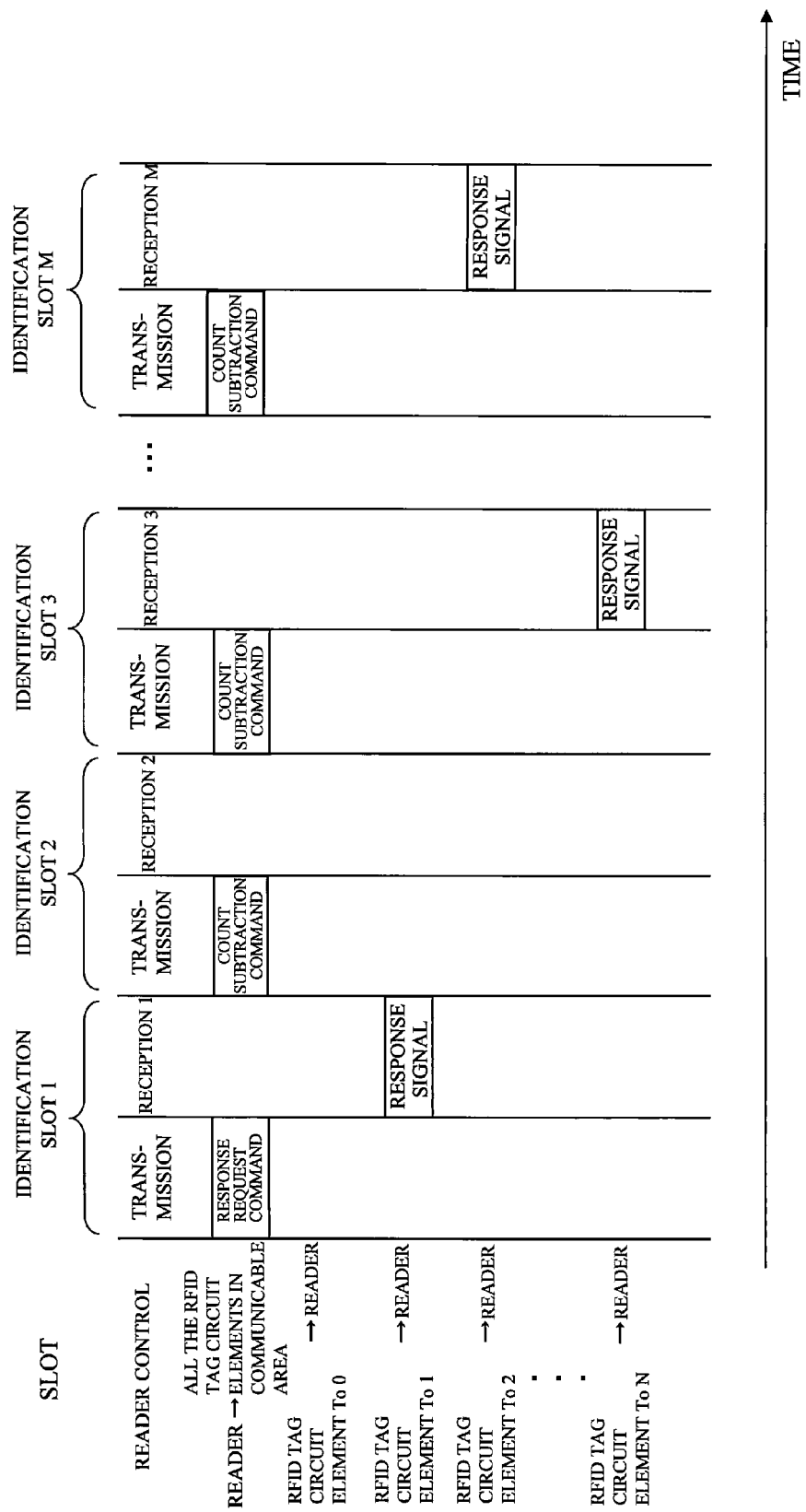
FIG. 9 is a diagram illustrating an example of a time chart of a signal transmitted or received between the reader executing the control procedure of the reading processing in FIG. 7 and N pieces of the RFID tag circuit elements executing the control procedure in FIG. 8.

In FIG. 9, a mode of a change over time from the left side to the right side in the figure is shown. Also, each identification slot is formed from transmission of the response request command or the count subtraction command by the reader 1 to reception of the response signal of the RFID tag circuit element To as one set.

First, in this example, an RFID tag circuit element To1 transmits a response signal in an identification slot 1. In this RFID tag circuit element To1, immediately after the response request command is transmitted from the reader 1, the count value is created as 0 from the first place by a random number. Then, after the reader 1 receives the response signal of the RFID tag circuit element To1, it transmits the count subtraction command in the subsequent identification slot 2. As a result, each of the RFID tag circuit elements To receives the count subtraction command and subtracts the count value of each of the RFID tag circuit elements To by 1. If there is any RFID tag circuit element To having the count value 0 at that time, the RFID tag circuit element To transmits a response signal in the identification slot 2. If there is no RFID tag circuit element To having the slot count value 0 as in the illustrated example, there is no reply in the identification slot. The reader 1 transmits the slot count subtraction command again each time the identification slot is finished.

By repeating the procedure, the reader 1 can receive all the response signals of the N pieces of RFID tag circuit elements To in M pieces of the identification slots. Here, the number M of the identification slots used and set by the reader 1 might be larger than the number N of the RFID tag circuit elements To as communication targets. In this case, since the count value of each of the RFID tag circuit elements To is generated by random number, the identification slots in which the respective RFID tag circuit elements To transmit the response signal are expected to uniformly and uniquely distribute over the M pieces of the identification slots. As described above, the reader 1 can clearly receive each of the response signals of all the N pieces of the RFID tag circuit elements To without collision or interference. In the case of interference, the reader 1 re-sets the slot number specified value Q corresponding to the moving speed v of the reader 1 at that time and re-executes the reading trial processing (See Step S25 in FIG. 6).

Also, there can be a case in which the number M of the identification slots prepared and set by the reader 1 is not larger than necessary to the number N of the RFID tag circuit elements To as communication targets but is an appropriate value. In this case, the time of a single session of the entire reading trial processing can be reduced, and efficient communication can be conducted. Moreover, in this case, the number of reading trial times per unit time when the reading trial processing is executed repeatedly can be increased as shown in FIG. 6.

In this embodiment configured as above, if the RF communication control part 10 creates a response request command and transmits it to the RFID tag circuit element To through the reader antenna 3, information stored in the IC circuit part 150 of the RFID tag circuit element To is acquired. At this time, if the reader 1 moves by movement of the operator himself carrying the reader or by means of a swinging operation of the arm, for example, the movement state is detected at Step S10 and Step S15 of FIG. 6. According to the detection result, at Step S20, on the basis of the slot-number specified value table shown in FIG. 5, the number of reading trial times by the reader antenna 3 and the RF communication control part 10 is controlled.

That is, as shown in FIG. 5, if the moving speed v of the reader 1 becomes faster, the number of reading trial times using the response request command is increased according to that. Specifically, in this embodiment, as shown by the slot-number specified value table in FIG. 4, it is set such that the slot number specified value Q is decreased in a stepped manner corresponding to the increase of the moving speed v of the reader 1. As a result, according to the increase of the moving speed v of the reader 1, the slot number specified value Q is decreased, that is, the number of reading trial times per unit time can be increased. As a result, remaining of the non-started tag caused since the response request command no longer reach a part of the RFID tag circuit elements To due to movement of the reader 1 and the tag does not respond can be avoided. As a result, information can be acquired more reliably from the plurality of RFID tag circuit elements To from which the information is to be acquired, and so-called non-reading can be eliminated.

Also, particularly in this embodiment, only the moving speed component in the horizontal direction is extracted (See FIG. 4). As a result, if the plurality of RFID tag circuit elements To as communication targets are aligned in the horizontal direction as in a case in which the RFID tag circuit elements To provided on articles arranged in a warehouse or on a shelf as in FIG. 1 are used as the communication targets, the reading control with less waste and higher accuracy can be executed.

In this embodiment, according to the moving speed v detected by the procedures at Step S10 and Step S15 in the flow of FIG. 6, the identification slot number M is controlled to be increased and decreased and the number of reading trial times per unit time is controlled to be increased and decreased, but the present invention is not limited to that. That is, the transfer speed of the response request command in the reader antenna 3 and the RF communication control part 10 may be controlled to be increased and decreased according to the detected moving speed v, for example, and the number of reading trial times per unit time may be controlled to be increased and decreased according to that.

As specific means of increase and decrease control of the transfer speed, there can be methods that the number of operation clocks of the entire reader 1 is increased and decreased or a transmission bit rate when the response request command is transferred in the RF communication control part 10 is increased and decreased, for example. In this case, if the number of operation clocks or the transmission bit rate is increased, required time of the response request command and each identification slot is reduced, that is, a required time of the single session of the entire reading trial processing can be reduced. The operation clock and the transmission bit rate in the RFID tag circuit element To may be also controlled to be increased and decreased similarly in synchronization.

The present invention is not limited to the above but is capable of various variations in a range not departing from its gist and technical idea. Such variations will be described below.

In this embodiment, the operator takes the portable reader 1 in hand and moves the reader 1 by swinging of the arm, but the present invention is not limited to that. For example, using a feeding device such as belt conveyer and a self-running bogie, the reader 1 may be automatically moved.

Figure 10:
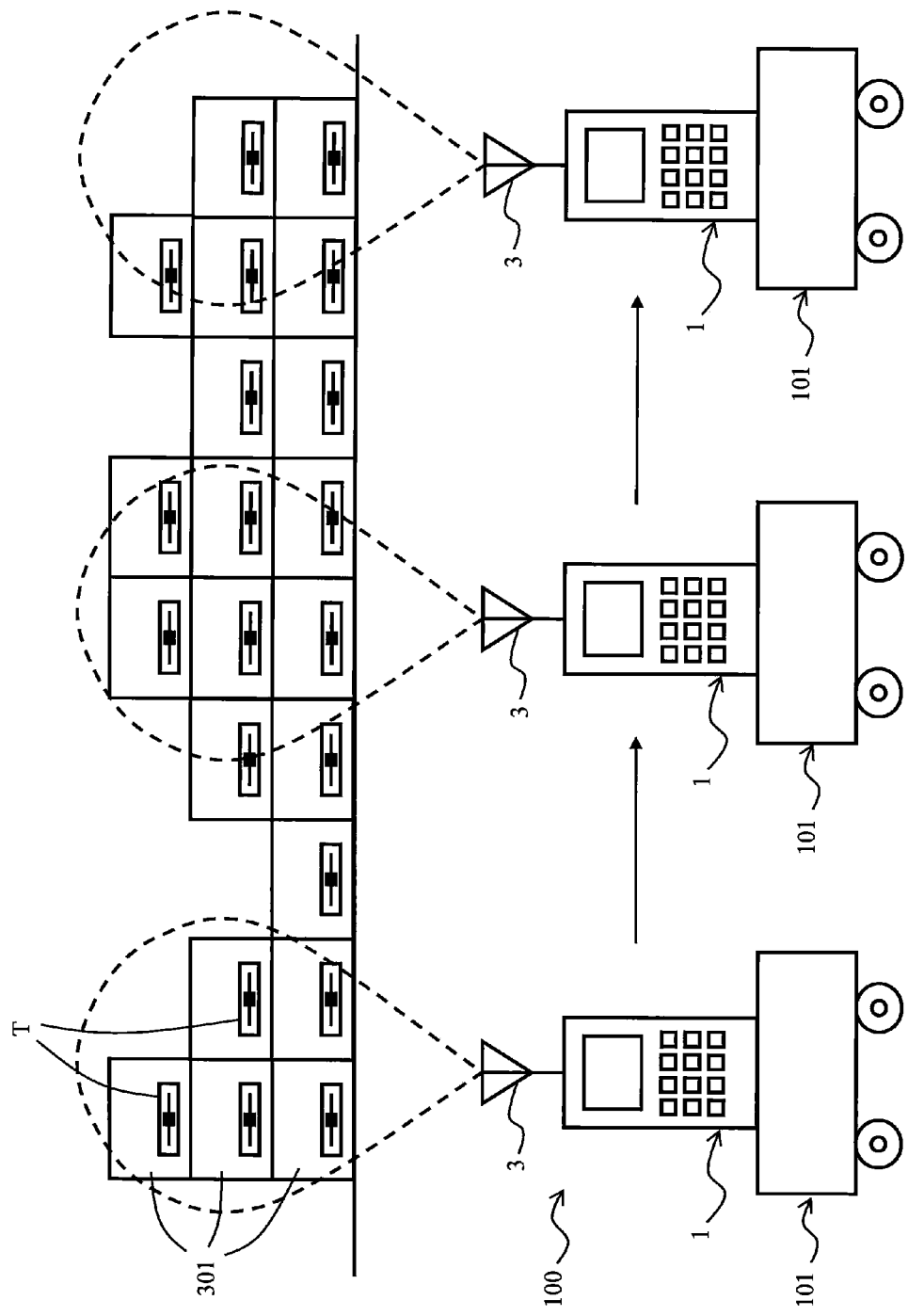
FIG. 10 is a diagram in a variation of automatic control of movement by installing the reader on a self-running bogie, illustrating an example of a case in which a self-running reader system is applied to management of articles stored in a warehouse.

In FIG. 10, a row of articles 301 loaded vertically in a warehouse is aligned in the horizontal direction, that is, in the right and left direction in the figure and stored. On a face on a front side of each of the articles 301, the RFID tag T is attached in the same direction as each other or with a longitudinal direction of the RFID tags T in the horizontal direction in the illustrated example.

In a self-running reader system 100, which is an RFID tag information reading system of this variation, the portable reader 1 of the embodiment is fixed onto a self-running bogie 101 movable by driving a wheel 102. In this self-funning reader system 100, the self-running botig 101 is automatically moved along the direction in which the article row is aligned by control of the CPU 4 provided in the reader 1. While executing the movement, the information relating to the corresponding article 301 is read from the RFID tag T attached to the article 301 via radio communication. As a result, a storage state of each of the articles 301 is managed.

Figure 11:
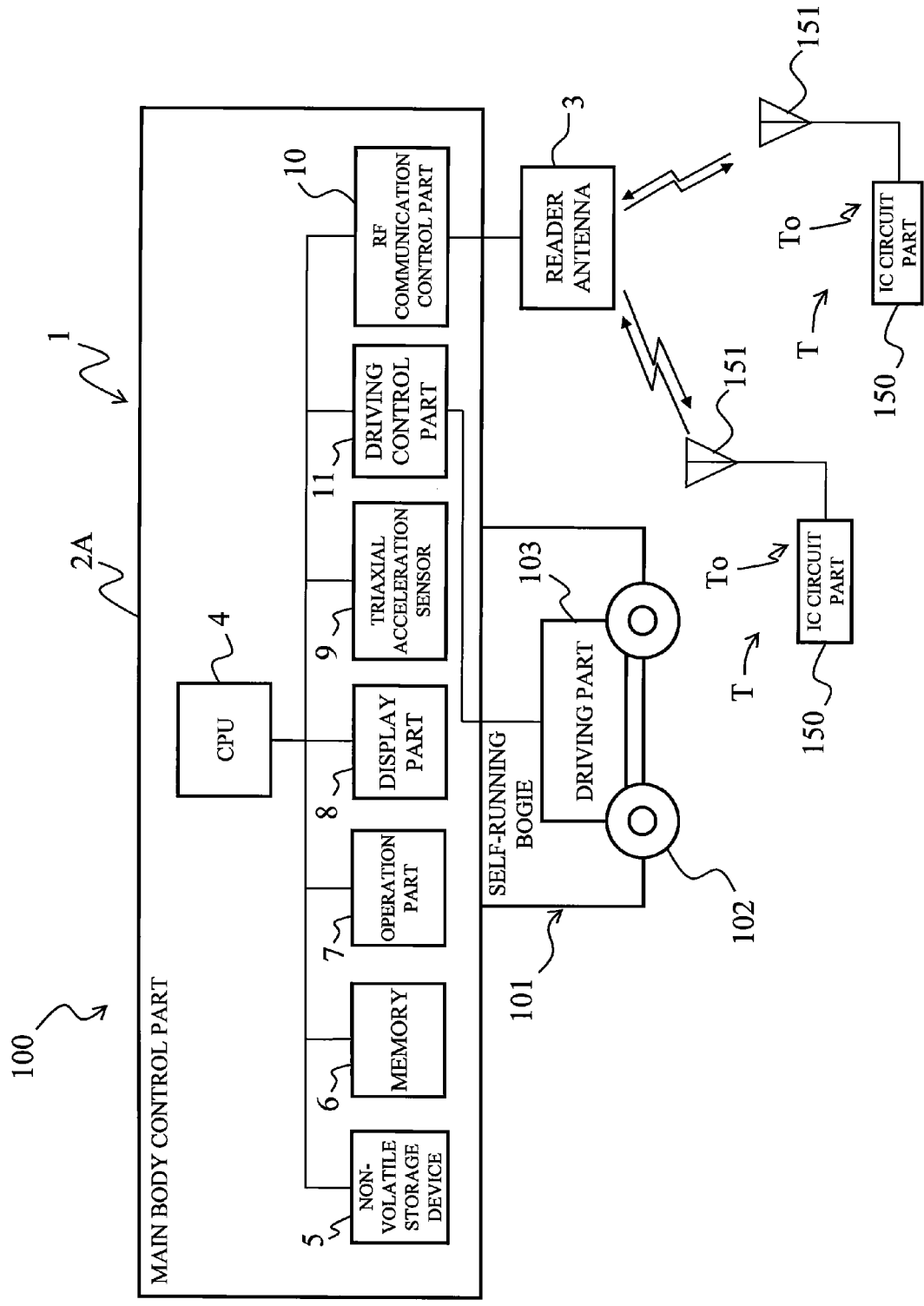
FIG. 11 is a system configuration diagram illustrating an outline of the self-running reader system in the variation of automatic control of movement by installing the reader on the self-running bogie.

FIG. 11 is a system configuration diagram illustrating an outline of the self-running reader system 100 of this variation. The same reference numerals are given to the portions equivalent to those in the configuration of the reader 1 in the embodiment and the explanation will be omitted as appropriate.

This self-running reader system 100 has a main body control part 2A, the reader antenna 3, and the self-running bogie 101 as a feeding device. The main body control part 2A is provided with a driving control part 11, and the self-running bogie 101 is provided with the wheel 102 and a driving part 103.

The driving part 103 of the self-running bogie 101 includes a motor, a gear box, and a brake, for example. The driving part 103 can move and stop the self-running reader system 100 at an arbitrary moving speed v by rotating and driving and stopping of the wheel 102. The driving control part 11 of the main body control part 2A controls the driving part 103 of the self-running bogie 101 on the basis of a control signal outputted from the CPU 4.

Figure 12:
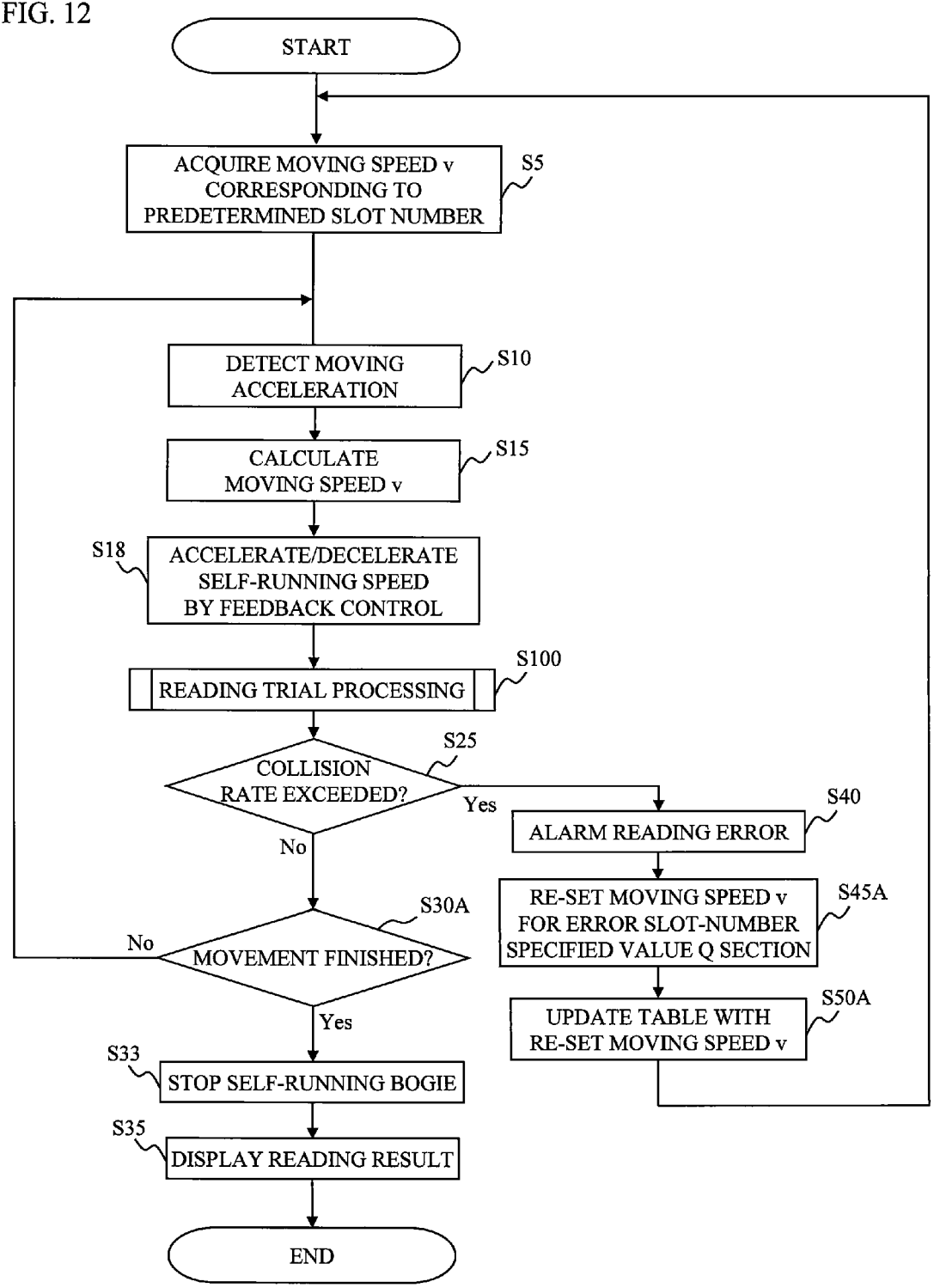
FIG. 12 is a flowchart illustrating a control procedure executed by a CPU of the reader in the variation of automatic control of movement by installing the reader on the self-running bogie.

FIG. 12 is a flowchart illustrating a control procedure executed by the CPU 4 of the main body control part 2A in this variation and a diagram corresponding to FIG. 6 in the embodiment. The flow in FIG. 12 is substantially the same as the flow in FIG. 6 and is basically different from FIG. 6 in points that Step S5 is newly provided before Step S10 in the flow of FIG. 6, Step S18 is provided instead of Step S20 in FIG. 6, Step S30A, Step S45A, and Step S50A are provided instead of Step S30, Step S45, and Step S50, and Step S33 is newly provided between Step S30A and Step S35.

In FIG. 12, in this variation, the slot number specified value Q desired by the operator in advance is determined typically or fixedly, for example. By controlling the moving speed v of the reader 1 as a moving amount based on this slot number specified value, that is, a target slot number specified value Q, the number of reading trial times per unit time is controlled.

That is, first, at Step S5, the CPU 4 acquires the target moving speed v corresponding to the target slot value Q determined in advance from the slot-number specified value table of the non-volatile storage device 5 as shown as an example in FIG. 5.

After that, the routine goes on to Step S10 similar to FIG. 6, and the CPU 4 detects moving acceleration by the acceleration sensor 9. After that, at Step S15 similar to FIG. 6, the CPU 4 calculates the moving speed v of the reader 1 by driving of the self-running bogie 101 on the basis of the detected moving acceleration.

At the newly provided Step S28, the CPU 4 outputs a control signal to the driving control part 11 so that the moving speed v of the reader 1 detected at Step S15 gets close to the target moving speed v acquired from the slot-number specified value table at Step S5. As a result, a control signal is outputted from the driving control part 11 to the driving part 103, a motor and a brake of the driving part 103 are controlled, and the self-running speed is accelerated or decelerated.

After that, the routine goes on to Step S100 similar to FIG. 6, and the CPU 4 executes the reading trial processing on the basis of the slot number specified value Q, which is the target slot number specified value. Then, the CPU 4 determines if the collision rate of the response signals in the reading trial processing has exceeded the predetermined value or not at Step S25 similar to FIG. 6. If the collision rate is at the predetermined value or less, the routine goes on to Step S30A taking place of Step S30 in FIG. 6.

At Step S30A, the CPU 4 determines if the bogie has reached a movement end position determined in advance, that is, the bogie has travelled for a target distance since it started self-running or not. If the bogie has not reached the movement end position, the determination at Step S30A is not satisfied, and the routine returns to Step S10 and repeats the similar procedure. On the other hand, if the bogie has reached the movement end position, the determination at Step S30A is satisfied, and the routine goes on to the newly provided Step S33. At Step S33, the CPU 4 outputs a control signal to the driving control part 11. As a result, the driving control part 11 outputs a control signal, and the driving part 103 stops the motor and operates the brake so as to stop the self-running bogie 101. After that, at Step S35 similar to FIG. 6, a reading result is displayed, and this flow is finished. The display of the read RFID tag information is not limited to the time when the bogie has reached the movement end position. That is, the reading result may be displayed sequentially in the middle of the movement while the reading is continued, that is, while the routine returns from Step S30A to Step S10 so as to repeat the similar procedure, for example.

On the other hand, if the collision rate of the response signals has exceeded the predetermined value at step S25, the determination is satisfied, and the routine goes on to Step S40 similar to FIG. 6. At Step S40, the CPU 4 alarms the reading error to the operator by displaying the fact that the reading trial processing has failed. This step functions as an alarming portion.

After that, the routine goes on to Step S45A corresponding to Step S45 in FIG. 6. At Step S45A, the CPU 4 executes the re-setting processing on the basis of the input operation by the operator on the operation part 7 to the target reader moving speed v corresponding to the slot number specified value Q when the reading trial processing failed.

That is, first, the CPU 4 outputs a display signal to the display part 8, for example. As a result, the display part 8 displays the moving speed v of the reader 1 and the slot number specified value Q which has been set corresponding to that when the reading error occurs immediately before on the display part 8 so that the operator can recognize it. In order to avoid the reading error, by decreasing the corresponding moving speed by a predetermined value, the operator can receive the response signal with allowance. Not limited to the arbitrary re-setting by the operator, similarly to that described above, automatic re-setting may be made along a predetermined pattern or at random. Also, if an external cause such as use of a mobile phone at occurrence of the reading error is known and it is confirmed that the cause will not occur again, this re-setting processing can be omitted.

After that, the routine goes on to Step S50A corresponding to Step S50, and the CPU 4 updates the value of the corresponding slot number specified value Q in the slot-number specified value table using the moving speed v re-set at Step S45A. However, if the re-setting is omitted, this updating procedure can be also omitted. This procedure functions as the correlation updating portion. By overwriting the slot-number specified value table by the value corresponding to the state after readjustment and updating it as above, setting of the moving speed v in the slot-number specified value table can be improved to an appropriate value to information acquisition in the actual communication environment. Also, by overwriting and updating the actual state as above, even if the number or type of the RFID tag circuit elements To or peripheral radio environment including an interfering wave, for example, is changed, the slot-number specified value table can be optimized, that is, made to be learned so as to follow the change.

When Step S50 is finished, the routine returns to Step S5, and the similar procedure is repeated.

Since the other procedures are similar to those in FIG. 6, the explanation will be omitted.

In the above, the procedures at Step S10 and Step S15 in the flow of FIG. 12 constitute a second movement detecting portion configured to detect a moving state of the reader 1 by the self-running bogie 101.

Also, the procedure at Step S18 in the flow of FIG. 12 constitutes a speed control portion configured to control to increase and decrease the moving speed of the reader 1 by the self-ruining bogie 101 according to the detected moving amount or moving direction. Moreover, the procedure at Step S18 in the flow of FIG. 12 constitutes a second reading control portion configured to control the number of reading trial times per unit time using the response request command of the reader antenna 3 and the RF communication control part 10 is also constituted according to the detection result by the procedures at Step S5 and Step S10.

In this variation configured as above, too, the same effect as that of the embodiment can be obtained.

That is, in this variation, when the RF communication control part 10 creates the response request command and transmits it to the RFID tag circuit element To through the reader antenna 3, the information stored in the IC circuit part 150 of the RFID tag circuit element To is acquired. At this time, if the reader 1 is moved by the self-running bogie 101, the moving state is detected by Step S10 and Step S15 in FIG. 12. Then, on the basis of the slot-number specified value table in FIG. 5 referred to at Step S5, according to the detection result at Step S15, the speed of the self-running bogie 101 is controlled at Step S18. As a result, the number of reading trial times by the reader antenna 3 and the RF communication control part 10 is controlled.

At this time, similarly to the embodiment, as shown by the slot-number specified value table in FIG. 4, it is set such that the moving speed v of the reader 1 is decreased corresponding to the increase of the slot number specified value Q. In comparison with various settings at transmission of the response request command such as the slog number specified value Q for setting the identification slot number, the transfer speed, if the moving speed v of the reader 1 by the self-running bogie 101 is too fast, the moving speed v of the reader 1 is made slow instead of change of the various settings at the transmission of the response request command. Then, the number of reading trial times using the response request command can be increased. As a result, remaining non-started tags generated when the response request command does not reach a part of the RFID tag circuit elements To by moving of the reader 1, and they do not respond can be avoided. Moreover, occurrence of non-reception of the response by the reader 1 that cannot receive the response since the reader 1 gets far away though the command has reached and the RFID tag circuit element To responded can be also avoided. Therefore, information can be reliably acquired from the plurality of RFID tag circuit elements To whose information is desired can be acquired, and so-called non-reading can be eliminated.

Moreover, there is also an effect that even if the alignment distance of the RFID tag group as reading targets in the horizontal direction is long, both stable self-running and reading are realized.

Since a direction of the self running is determined in advance, a monoaxial acceleration sensor that can detect only acceleration in one direction can be used as an acceleration sensor. The self-running speed, that is, the moving speed v can be also detected by detecting an operation state of the driving part 103. Therefore, a rotary encoder or the like may be disposed in the driving part 103 instead of the acceleration sensor 9 so that the moving speed v may be detected by the rotary encoder.

Also, the feeding device for the reader 1 is not limited to the self-running bogie 101 as above but a belt conveyer or the like may be applied. In this case, it is only necessary that at least the reader antenna 3 and the acceleration sensor 9 are made to self-run. Therefore, only by ensuring connection of the acceleration sensor 9 and the reader antenna 3, the other portions including the CPU 4 or the like may be installed on a fixed portion of the belt conveyer. Also, the moving speed v of the reader antenna 3 may be detected from the operation state of the driving part 103 of the belt conveyer as described above.

Other than those having been described above, method according to the embodiment and the variations may be combined as appropriate for use.

Though not exemplified respectively, the present invention is put into practice with various changes added in a range not departing from its gist.

What is claimed is:

1. An apparatus for reading radio frequency identification (RFID) tag information configured to perform information transmission and reception with a plurality of RFID tag circuit elements having an IC circuit part storing information and a tag antenna connected to said IC circuit part, comprising:

a first movement detecting portion configured to detect a moving state of said apparatus for reading RFID tag information;

a transmitting portion configured to generate a reading command to acquire the information stored in said IC circuit part and to transmit the command to said RFID tag circuit element; and a first reading control portion configured to control the number of reading trial times per unit time using said reading command by said transmitting portion according to a detection result of said first movement detecting portion, said first movement detecting portion including a moving amount detecting portion configured to detect a moving amount of said apparatus for reading RFID tag information or a moving direction detecting portion configured to detect a moving direction of said apparatus for reading RFID tag information, wherein the apparatus for reading RFID tag information further comprises a correlation storage device configured to store and maintain a correlation between said moving amount or said moving direction and said number of reading trial times per unit time corresponding to the moving amount or the moving direction, and wherein on the basis of the correlation of said correlation store device, control is executed so that said number of reading trial times per unit time is realized corresponding to the moving amount detected by said moving amount detecting portion or the moving direction detected by said moving direction detecting portion by means of said first reading control portion.

2. The apparatus for reading RFID tag information according to claim 1, further comprising:

a moving component extracting portion configured to extract a component in a predetermined direction in the moving amount detected by said moving amount detecting portion or the moving direction detected by said moving direction detecting portion, wherein said first reading control portion controls the number of reading trial times per unit time using said reading command by said transmitting portion according to an extraction result of said moving component extracting portion.

3. The apparatus for reading RFID tag information according to claim 1, wherein:

said moving component extracting portion extracts only a horizontal direction component among the moving amount detected by said moving amount detecting portion or the moving direction detected by said moving direction detecting portion.

4. The apparatus for reading RFID tag information according to claim 1, further comprising:

a receiving portion capable of receiving a response signal and sorting said response signal into any one of a plurality of identification slots, said response signal transmitted from said plurality of RFID tag circuit elements according to said reading command being created and transmitted by said transmitting portion.

5. The apparatus for reading RFID tag information according to claim 4, wherein:

said first reading control portion includes a slot control portion configured to control to increase and decrease said number of identification slots used by said receiving portion according to the moving amount detected by said moving amount detecting portion or the moving direction detected by said moving direction detecting portion.

6. The apparatus for reading RFID tag information according to claim 4, wherein:

said first reading control portion includes a transfer speed control portion configured to control to increase and decrease a transfer speed of said reading command by said transmitting portion according to the moving amount detected by said moving amount detecting portion or the moving direction detected by said moving direction detecting portion.

7. The apparatus for reading RFID tag information according to claim 5, further comprising:

a collision determining portion configured to determine if the number of said identification slots in which a collision of said response signals occurred among said plurality of identification slots is a predetermined proportion or more at reception by said receiving portion.

8. The apparatus for reading RFID tag information according to claim 7, further comprising:

an alarming portion configured to give a predetermined alarm for readjustment of the control of said number of identification slots by said slot control portion or the control of the transfer speed of said reading command by said transfer speed control portion if determination of said collision determining portion is satisfied.

9. The apparatus for reading RFID tag information according to claim 7, further comprising:

a correlation updating portion configured to perform an update process to said correlation stored and maintained in said correlation storage device after readjustment of the control of said number of identification slots by said slot control portion or of the control of the transfer speed of said reading command by said transfer speed control portion if determination of said collision determining portion is satisfied.

10. An RFID tag information reading system comprising:

an apparatus for reading RFID tag information having a transmitting portion configured to generate a reading command to acquire information stored in an IC circuit part of a plurality of RFID tag circuit elements including the IC circuit part storing the information and a tag antenna connected to the IC circuit part and transmitting the reading command to said RFID tag circuit elements;

a feeding device configured to feed said apparatus for reading RFID tag information;

a movement detecting portion configured to detect a moving state of said apparatus for reading RFID tag information by said feeding device; and a reading control portion configured to control the number of reading trial times per unit time using said reading command by said transmitting portion according to a detection result of said movement detecting portion, said movement detecting portion including a moving amount detecting portion configured to detect a moving amount of said apparatus for reading RFID tag information or a moving direction detecting portion configured to detect a moving direction of said apparatus for reading RFID tag information, wherein the RFID tag information reading system further comprises a correlation storage device configured to store and maintain a correlation between said moving amount or said moving direction and said number of reading trial times per unit time corresponding to the moving amount or the moving direction, and wherein said reading control portion executes control on the basis of the correlation of said correlation storage device so that said number of reading trial times per unit time is realized corresponding to the moving amount detected by said moving amount detecting portion or the moving direction detected by said moving direction detecting portion.

11. The RFID tag information reading system according to claim 10, wherein:

said reading control portion includes a speed control portion configured to control to increase and decrease a moving speed of said apparatus for reading RFID tag information by said feeding device according to the moving amount detected by said moving amount detecting portion or the moving direction detected by said moving direction detecting portion.

* * * * *